(12) United States Patent
Niaz (10) Patent No.: US 10,422,268 B2
(45) Date of Patent: Sep. 24, 2019

(54) MOUNTING INTERFACE FOR EXHAUST GAS TREATMENT ASSEMBLY

(71) Applicant: Perkins Engines Company Limited, Peterborough (GB)

(72) Inventor: Naseer Niaz, Peterborough (GB)

(73) Assignee: Perkins Engines Company Limited, Peterborough (GB)

(*) Notice: Subject to any disclaimer, the term of this patent is extended or adjusted under 35 U.S.C. 154(b) by 40 days.

(21) Appl. No.: 15/816,250

(22) Filed: Nov. 17, 2017

(65) Prior Publication Data
US 2018/0156103 A1 Jun. 7, 2018

(30) Foreign Application Priority Data

Dec. 1, 2016 (GB) .................................. 1620440.6

(51) Int. Cl.
*F01N 13/18* (2010.01)
*F01N 3/00* (2006.01)

(52) U.S. Cl.
CPC ........... *F01N 13/1844* (2013.01); *F01N 3/00* (2013.01); *F01N 13/1805* (2013.01);
(Continued)

(58) Field of Classification Search
CPC ...... F01N 3/2066; F01N 3/00; F01N 13/1805; F01N 13/185; F01N 13/1872; F01N 13/1888; F01N 13/1838; F01N 13/017; F01N 13/1855; F01N 13/1844; F01N 13/1822; F01N 13/009; F01N 3/206; F01N 2590/08; F01N 2450/18; F01N 2470/06; F01N 2470/20; F01N 2470/24; F01N 2450/20; F01N 2260/18; F01N 2450/02; F01N 2450/30; F01N 3/10; F01N 2470/02; F01N 2470/22; F01N 2590/10; F01N 2450/24; F16B 2/08; Y02T 10/24;
(Continued)

(56) References Cited

U.S. PATENT DOCUMENTS 4,020,539 A * 5/1977 Vroman ................ F01N 3/2853
29/890
4,335,078 A * 6/1982 Ushijima .............. F01N 3/2853
29/890
(Continued)

FOREIGN PATENT DOCUMENTS

DE         4316870     11/1994
DE    202007004230 U1  7/2008
(Continued)

*Primary Examiner* — Mark A Laurenzi
*Assistant Examiner* — Mickey H France (57) ABSTRACT

An exhaust gas treatment assembly comprises a housing which is radially inwardly deformed in a clamping region to retain a block of ceramic or other material which may be arranged as a filter or catalyst within the housing. The clamping region is deformed to a first surface level and includes local protuberances which extend radially outwardly to a second surface level and support a mounting surface for mounting the assembly in a mounting connector. The first surface level may vary to accommodate the dimensions of each individual block while the second surface level is fixed so that the mounting surface can fit in a mounting assembly with standardized dimensions.

14 Claims, 4 Drawing Sheets

(52) U.S. Cl.
CPC ....... *F01N 13/185* (2013.01); *F01N 13/1872* (2013.01); *F01N 13/1888* (2013.01); *F01N 2260/18* (2013.01); *F01N 2450/02* (2013.01); *F01N 2450/18* (2013.01); *F01N 2450/20* (2013.01); *F01N 2470/06* (2013.01); *F01N 2470/20* (2013.01); *F01N 2470/24* (2013.01); *Y02T 10/20* (2013.01)

(58) Field of Classification Search
CPC . Y02T 10/20; Y02A 50/2325; B01D 53/9409; B01D 53/944; B01D 53/88; Y10T 29/49947
USPC .................................................... 60/272–324
See application file for complete search history.

(56) References Cited

U.S. PATENT DOCUMENTS

| | | | |
|---|---|---|---|
| 5,251,439 A * | 10/1993 | Nakase | B63B 35/731 440/88 J |
| 5,380,501 A | 1/1995 | Hitachi et al. | |
| 5,410,877 A | 5/1995 | Shimada et al. | |
| 8,302,306 B2 * | 11/2012 | Hill, Jr. | F01N 3/2853 29/445 |
| 9,314,750 B2 | 4/2016 | Stanavich et al. | |
| 9,352,276 B2 | 5/2016 | Sampath | |
| 2003/0015872 A1 | 1/2003 | Potts et al. | |
| 2006/0202480 A1 * | 9/2006 | Cassel | F01N 13/1805 285/408 |
| 2010/0186394 A1 | 7/2010 | Harrison et al. | |
| 2011/0023452 A1 * | 2/2011 | Gisslen | F01N 13/1827 60/272 |
| 2014/0174060 A1 * | 6/2014 | Baig | F01N 3/2839 60/299 |
| 2014/0175238 A1 | 6/2014 | Roozenboom et al. | |
| 2014/0248186 A1 | 9/2014 | Denis et al. | |
| 2015/0217634 A1 * | 8/2015 | Sawai | B60K 15/063 280/834 |
| 2016/0053661 A1 | 2/2016 | Freeman et al. | |
| 2016/0115847 A1 | 4/2016 | Chapman et al. | |
| 2017/0009638 A1 * | 1/2017 | Suetou | F01N 3/2066 |

FOREIGN PATENT DOCUMENTS

| | | |
|---|---|---|
| DE | 202012100235 | 6/2013 |
| EP | 2151152 A1 | 2/2010 |
| JP | 58-051211 A | 3/1983 |
| WO | 2014/167355 A1 | 10/2014 |
| WO | 2014/175238 A1 | 10/2014 |
| WO | 2014167354 | 10/2014 |

* cited by examiner

MOUNTING INTERFACE FOR EXHAUST GAS TREATMENT ASSEMBLY

TECHNICAL FIELD

This invention relates to exhaust gas treatment assemblies of the type comprising a gas permeable block arranged in a housing, and particularly to means for mounting such an assembly on an engine or other support.

BACKGROUND

An exhaust gas treatment assembly typically comprises one or more gas permeable blocks of ceramic or mineral material which are clamped in a housing, typically cylindrical and often referred to as a can. The housing defines a flowpath with inlet and outlet connections via which exhaust gas is directed to flow through the block or blocks. Each block may act as a filter, for example, if the assembly is to function as a diesel particulate filter (DPF), or may comprise a catalyst, for example, if the assembly is to function as a diesel oxidation catalyst (DOC) or selective catalytic reductor (SCR). The blocks may be formed with numerous parallel channels separated by thin walls and opening alternately at either end of the block or otherwise as known in the art to allow gas to flow through the block from one axial end to the other.

In order to form a gas tight seal with the wall of the housing to prevent exhaust gas from bypassing the block, and in order to retain the block inside the housing against movement due to vibration or inertial forces, for example when mounted on an engine or in other mobile applications, the wall of the housing may be compressed radially inwardly, e.g. crimped or swaged, to provide a compressive force which bears radially inwardly against the block to hold it in a fixed position within the housing. Since the blocks are typically hard and brittle and may reach a high temperature in use due to the exhaust gas temperature or additional heating means, a compressible material such as a needle mat may be arranged around the block to cushion the block and accommodate differential expansion between the block and the housing. The block and mat may be arranged in the housing before compression of the housing, or alternatively may be installed in the housing after compression, for example, through a gradually tapering guide which compresses the mat as the block slides into the housing.

Since the material of the block has limited compressive strength, it is necessary to distribute the compressive force over a sufficient area of the block to provide a firm and gas tight assembly, which in turn imposes a lower limit on the axial length of the housing which must be compressed to hold the block in position. It is also necessary to provide the housing with inlet and outlet connections which can be made or unmade as required for assembly or routine maintenance, and a suitable mounting interface comprising a surface or surfaces via which the housing can be connected to a support. In some applications, for example, to avoid vibration damage when mounting the housing on an engine, it may be preferred to provide a rigid connection to minimise movement of the housing relative to the support. The overall axial length of the housing must be sufficient to accommodate the block as well as the mounting interface and inlet and outlet connections, which in turn imposes dimensional constraints on adjacent components of a vehicle or other machine on which the assembly will be used.

In practice, relatively large dimensional variations (for example, +/−2 mm or more in diameter) are known to occur in otherwise identical gas permeable blocks for use in such assemblies, even when manufactured under identical conditions in the same production facility and even in the same batch. It is therefore common to manufacture the housings as standard units with the same, predetermined dimensions, and then to radially inwardly compress the region of each housing within which the block is to be clamped, by a different radial distance to correspond to the measured dimensions of the or each individual block which is (or will be) inserted into the housing.

Since after assembly the compressed region of each housing therefore has a different diameter, it is often preferred to mount the housing on a support using a mounting strap or the like which is adjustable to conform to the dimensions of the housing. For example, US20160053661 discloses an exhaust gas treatment assembly including a heat shield and flowhood and mounted on a support via straps and saddles which are arranged to distort to conform to the dimensions of the assembly.

However, adjustable mounting means may not provide an ideally rigid connection to the support.

SUMMARY

Disclosed herein is an exhaust gas treatment assembly including a housing, at least one gas permeable block, and an external mounting surface configured to receive a mounting connector for mounting the assembly on a support. The housing has an axis and a clamping region, the clamping region having an external surface, an axial length, and opposite axial extremities spaced apart by the axial length, and defines a flowpath extending through the housing along the axis. The block is clamped within the clamping region of the housing to extend axially at least to the opposite axial extremities of the clamping region so that exhaust gas may flow along the flowpath through the block. The housing further includes at least one protuberance arranged axially between the opposite axial extremities of the clamping region. When considered with respect to the axis in a plane containing the axis, the at least one protuberance extends radially outwardly of a first surface level defined by a straight line contacting the external surface of the clamping region at each of its opposite axial extremities, and the mounting surface is supported by the at least one protuberance and arranged axially between the opposite axial extremities of the clamping region and radially outwardly of the first surface level.

Further disclosed are a plurality of such assemblies, wherein, when considered with respect to the axis in said plane containing the axis, the at least one protuberance extends radially outwardly to a second surface level defined by a straight line parallel with the axis and contacting the external surface of the clamping region at the at least one protuberance, but not passing through the at least one protuberance. The first surface level is spaced apart from the axis by a respective, first radial dimension at each respective one of the opposite axial extremities of the clamping region, and the second surface level is spaced apart from the axis by a second radial dimension. The second radial dimension is the same for each of the assemblies, but the first radial dimension at each of the opposite axial extremities of the clamping region is different for each of the assemblies.

Further features and advantages will become apparent from the following illustrative embodiment which will now be described, purely by way of example and without limitation to the scope of the claims, and with reference to the accompanying drawings, in which:

BRIEF DESCRIPTION OF THE DRAWINGS

Reference numerals or letters appearing in more than one of the figures indicate the same or corresponding parts in each of them.

DETAILED DESCRIPTION

Figures 9, 10:
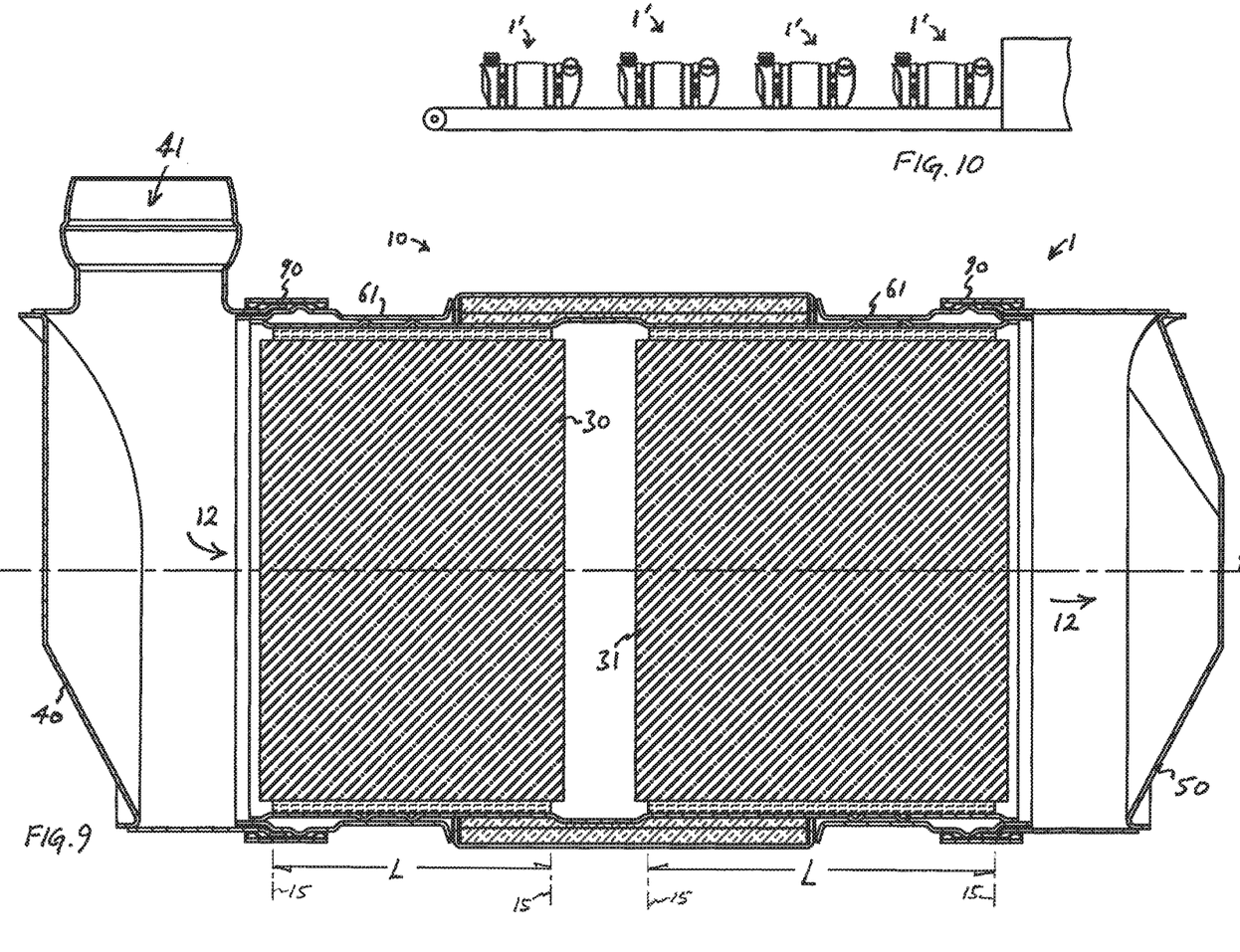
FIG. 9 is a longitudinal section through the first assembly of FIG. 1 at IX-IX in a plane containing the axis.
FIG. 10 shows the first assembly with other, similar assemblies on a production line.

Referring to the figures, a first exhaust gas treatment assembly 1 includes a housing 10 having a generally cylindrical wall 11 and defining a flowpath 12 extending through the housing along its length axis X. Two cylindrical gas permeable blocks 30, 31 are arranged within the housing, each block being surrounded radially by a body or mat of compressible material 32, e.g. a needle mat, which cushions the block against the inner surface of the outer wall 11 which exerts a radially inward force against the mat and block, holding each block in compression to clamp it in a fixed position inside a respective clamping region 13, 13' of the housing as shown in FIG. 9.

The housing 10 is closed at its opposite axial ends by first and second end caps, the first end cap 40 having an inlet 41 and the second end cap 50 having an outlet 51 via which exhaust gas can flow along the flowpath 12 through the blocks. The housing and end caps may be made from metal, e.g. sheet steel, while the blocks may be made for example from a hard ceramic or mineral material, either with or without channels to distribute the flow through the block, to function for example as a filter or catalyst for aftertreatment of the exhaust gas. In the illustrated example, the block 30 at the inlet end of the housing is a diesel oxidation catalyst while the block 31 at the outlet end of the housing is a diesel particulate filter. Of course, in alternative embodiments only one block or more than two blocks might be provided in series and/or parallel relation in the flowpath.

Each block 30, 31 is measured after manufacture, and the wall 11 of the housing pressed radially inwardly (e.g. in a crimping or swaging machine as known in the art) to form the clamping regions 13, 13' which will retain the block in position. The clamping region may be formed with the block in situ or alternatively, as in the illustrated example, before inserting the block axially into the housing via a tapered guide (not shown).

Figure 6:
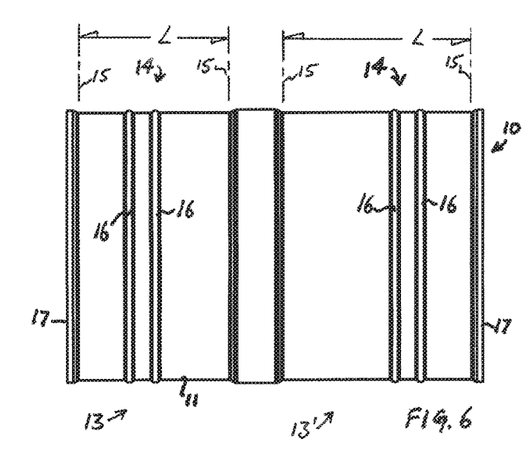
FIG. 6 shows the housing with the outer shroud removed.

As shown in FIG. 6, each clamping region 13, 13' has an external surface 14 and an axial length L between its opposite axial extremities 15. After assembly, each block 30, 31 is positioned in the housing so that it extends axially at least to the opposite axial extremities 15 of the respective clamping region 13, 13' and clamped in that position by the radially inward pressure of the wall 11 of the housing.

Figure 11:
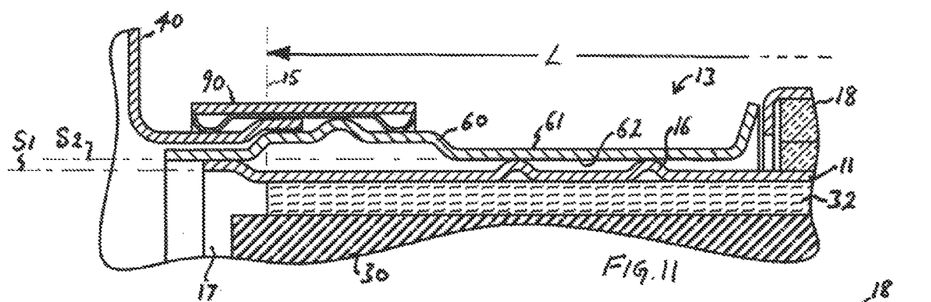
FIG. 11 is an enlarged view of part of the section of FIG. 9.

The radially depressed region of the housing defining the clamping region 13 or 13' may extend axially to or beyond the ends of the block or mat if desired, in which case the axial extremities 15 of the clamping region are taken to be axially coincident with the ends of the block or mat as illustrated in FIG. 11. However, where it is desired to minimise the axial length of the assembly, the clamping region may be arranged with a slightly shorter axial length than the block or mat, in which case its axial extremities 15 are defined where the internal profile of the wall 11 in the clamping region begins to diverge from the external profile of the block or mat (i.e. the point at which the compressive clamping force begins to diminish), at a point which may be slightly axially inward of the ends of the block or mat. In either case, the axial length of the clamping region may be minimised while applying a compressive clamping force over all or nearly all of the external surface of the block, as shown.

Referring to FIGS. 6, 7, 9, 11, 12 and 13, each clamping region 13, 13' includes at least one protuberance arranged axially between its opposite axial extremities 15 and extending radially outwardly away from the axis X. In the example shown, each clamping region is formed with two such protuberances, each protuberance comprising an annular rib 16, which extend around the housing in axially spaced, parallel relation.

Figure 12:
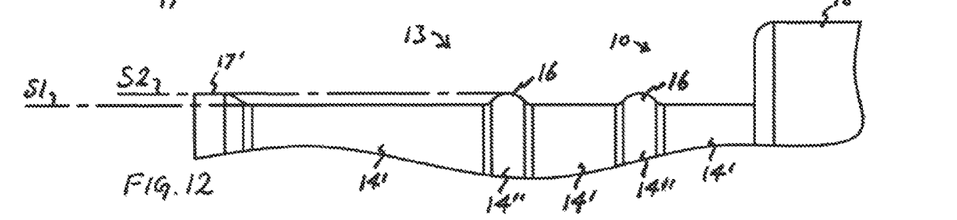
FIG. 12 is an enlarged view of part of the clamping region of the housing as shown in FIG. 5.

As shown in FIGS. 6 and 12, the inwardly depressed portion or portions 14' of the external surface 14 of each clamping region lying axially between and outward of the protuberances or ribs 16 may be axially longer than the remaining portion or portions 14'' of its external surface which extend over the protuberances, so that the radially inwardly depressed portions 14' extend along most of the axial length L of the respective clamping region 13, 13'.

When considered with respect to the axis X in a plane containing the axis, as shown in FIGS. 9 and 11, the at least one protuberance extends radially outwardly of a first surface level S1 defined by an imaginary straight line contacting the external surface 14 of the clamping region at each of its opposite axial extremities 15.

Figure 7:
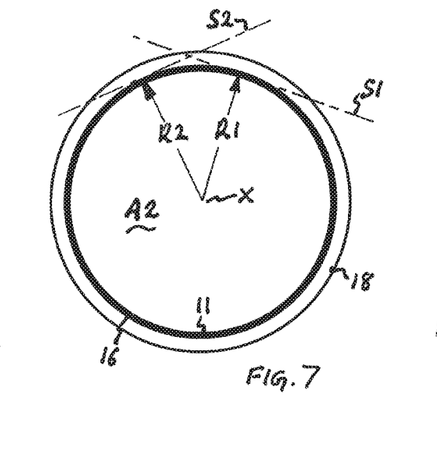
FIG. 7 is a cross-section through the clamping region of the housing as shown in FIG. 5 at VII-VII in a plane normal to its length axis.
Figure 8:
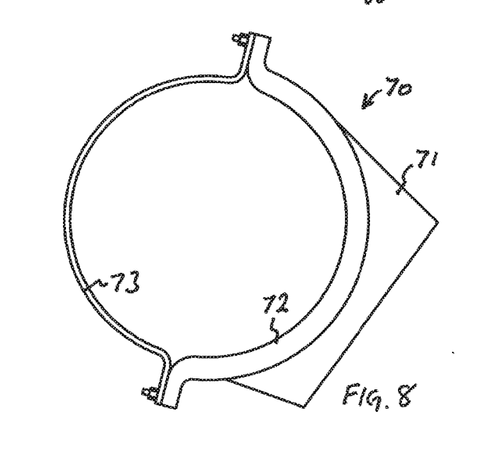
FIG. 8 shows the mounting connector.

As illustrated in the exemplary embodiment and best seen in FIG. 7, the radially inwardly depressed portion 14' of the external surface of the clamping region may be cylindrical, so that the first surface level S1 is parallel with the axis X and the external surface portion 14' extends at the first surface level S1 for the whole of its axial length.

Figure 13:
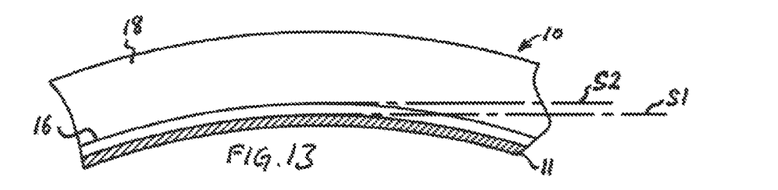
FIG. 13 is an enlarged view of part of the section of FIG. 7.

It can be seen that the wall 11 of the housing may have a substantially constant thickness throughout the axial length L of the clamping region in a plane containing the axis X or normal to the axis, as shown in FIGS. 9, 11 and 13. After forming the housing, as best seen in FIG. 11, the external surface 14 of the clamping region may be formed by an external surface of the wall 11, with the at least one protuberance comprising a region of the wall 11 which is deformed radially outwardly with respect to the axis X.

When considered with respect to the axis X in a plane containing the axis, as shown in FIGS. 9 and 11, it can be seen that the at least one protuberance comprising each of the ribs 16 extends radially outwardly to a second surface level S2, which is defined by a straight line parallel with the axis X and contacting the external surface 14 of the clamping region at the at least one protuberance, which is to say, at each rib 16, but not passing through the at least one protuberance.

The first surface level S1 is spaced apart from the axis X by a respective, first radial dimension R1 at each axial extremity 15 of the clamping region, the second surface level S2 being spaced apart from the axis X by a corresponding second, greater radial dimension R2.

As shown in FIG. 10, a plurality of like assemblies 1, 1' may be manufactured by pressing each clamping region 13, 13' of each respective housing to define a different, first radial dimension R1 determined by the measured diameter of the respective individual block 30, 31 to be received in that individual clamping region, so that the first radial dimension R1 at each of the opposite axial extremities of the respective clamping region is different for each of the assemblies. However, the ribs 16 or other protuberances may be formed, e.g. by pressing them radially outwardly between opposed, internal and external formers, to define a second radial dimension R2 which is the same for each of the assemblies.

The housing may be formed for example using radially adjustable, internal and external formers arranged in two segmented arrays, one radially inside the other as known in the art, with the formers used to define the second dimension R2 being set to a predefined position while the formers used to define the first dimension R1 are adjustable to conform to the measured dimensions of the individual block. Other forming procedures, e.g. pressing, crimping, or swaging techniques may also be used. The cross section of the clamping region and at least one protuberance may be cylindrical or near cylindrical depending on the nature of the forming process, the term "cylindrical" being construed mutatis mutandis to include the mean profile of a near-cylindrical or substantially cylindrical form.

As best seen in FIGS. 7 and 13, each rib 16 extends around the axis X, and the second surface level S2 extends around the axis X to define a predetermined section area A2 in a plane normal to the axis X. The second surface level S2 defined by the radially outermost part of the external surface 14" of the ribs 16 may be a cylindrical surface of rotation about the axis X as illustrated, so that when considered in a plane normal to the axis, the second surface level S2 defines a circle centred on the axis X and the section area A2 is defined as the area of the circle ($\pi \cdot R2^2$). It will be understood that where as shown the second radial dimension R2 is the same for each of a plurality of exhaust gas treatment assemblies, the predetermined section area A2 will also be the same for each of the assemblies.

After forming the clamping regions 13, 13', the central region of the housing may be enclosed in an insulative shroud 18.

Figures 1, 2, 4:
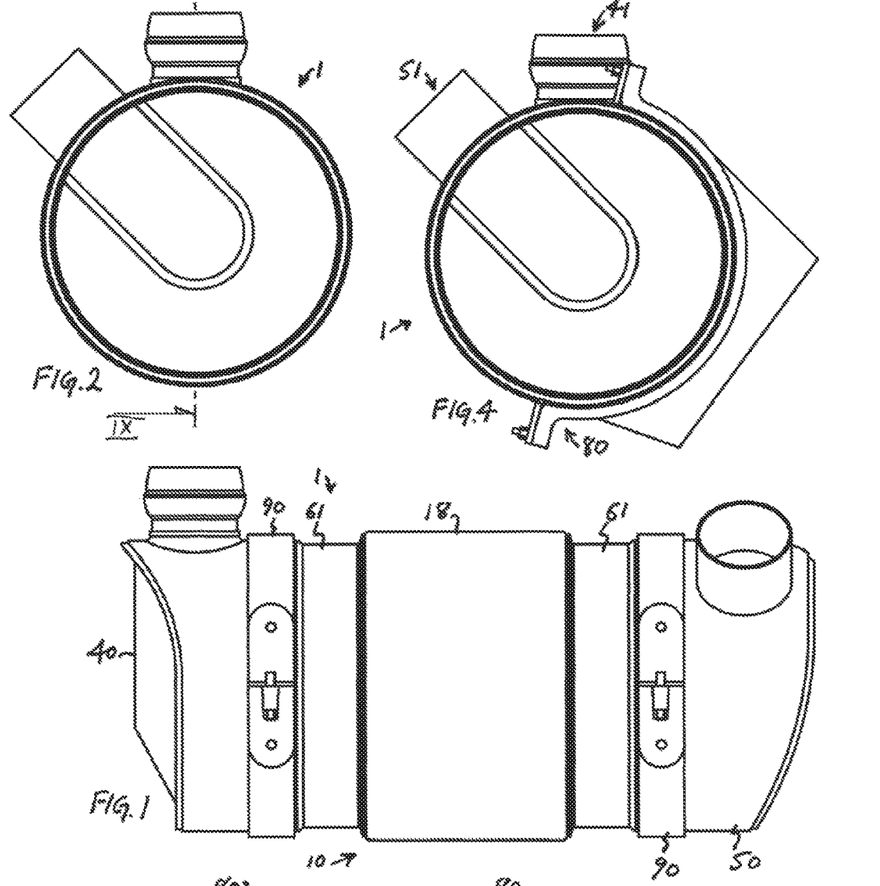
FIG. 1 shows a first exhaust gas treatment assembly containing two gas permeable blocks arranged within a housing.
FIG. 2 is an end view of the first assembly as shown in FIG. 1.
FIG. 4 is an end view of the first assembly as shown in FIG. 3.
Figure 3:
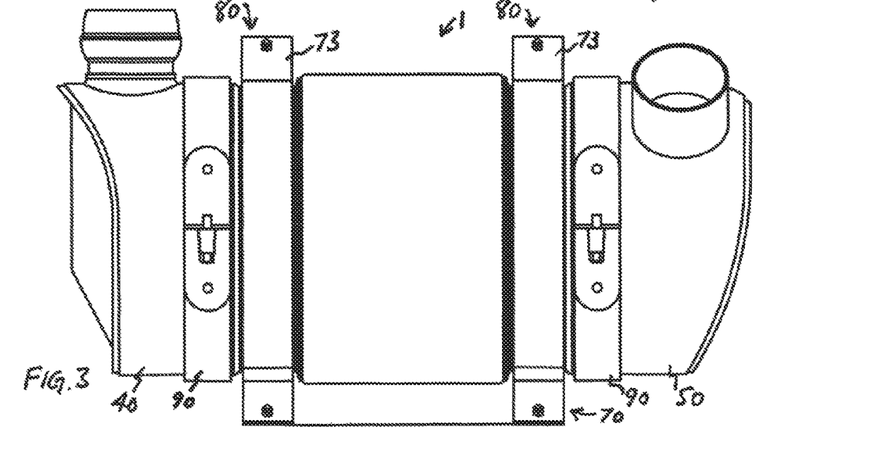
FIG. 3 shows the first assembly mounted in a mounting connector.
Figure 5:
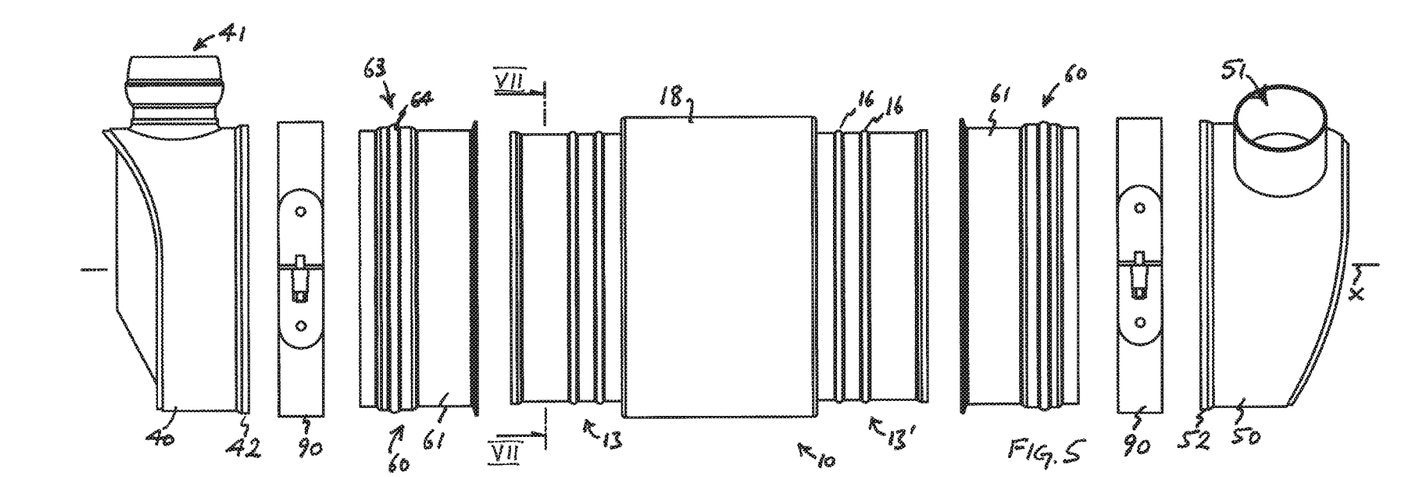
FIG. 5 is an exploded view of the first assembly not showing the gas permeable blocks.

Referring to FIGS. 5 and 11, the first assembly 1 may further include a mounting band or, as shown, a pair of identical mounting bands 60, each of which in the illustrated embodiment is generally annular and is arranged to extend around the housing 10 in contact with the at least one protuberance comprising ribs 16, so that the mounting band encircles the respective clamping region 13 or 13'.

Each mounting band includes a radially outward surface region defining a mounting surface 61, which in the illustrated embodiment defines a cylindrical surface of rotation about the axis X in the installed position as shown. The mounting band may also include a radially outwardly raised annular region 63 with an annular rib 64 axially adjacent the mounting surface 61.

As shown, the mounting surface 61 may be the radially external surface of a wall whose opposite, parallel, radially internal cylindrical surface 62 extends at the second surface level S2 to form a close or interference fit on the radially outermost part of the external surface 14" of each rib. The mounting band 60 may also be fixed, e.g. welded to an adjacent axial end region 17 of the housing. When considered with respect to the axis X in a plane containing the axis as shown in FIGS. 9 and 11, a radially outward surface 17' of the housing at the axial end region 17 may be arranged radially outwardly of the first surface level S1, conveniently as shown at the second surface level S2, to provide a seat for the mounting band.

In the installed position of the mounting band 60 as best seen in FIG. 11, the mounting surface 61 is thus supported by the at least one protuberance comprising ribs 16 and arranged axially between the opposite axial extremities 15 of the respective clamping region 13, 13' and radially outwardly of the first surface level S1.

Referring to FIGS. 3, 4, 8 and 14, the external mounting surface 61 is configured to receive a mounting connector 70 for mounting the exhaust gas treatment assembly 1 on a support, for example, an engine 2. In the illustrated embodiment, the mounting connector 70 comprises a base 71 which is attachable to the support, a pair of cradles 72, each of which receives a portion of the mounting surface 61 of a respective one of the mounting bands 60, and a pair of clamp bands 73 which extend over the remainder of the mounting surface 60 and are bolted to the cradles to fix the assembly 1 to the support. Of course, the mounting connector 70 could be configured other than as illustrated.

It will be appreciated that since the second surface level S2 and section area A2 may be the same for each of the exhaust gas treatment assemblies, a plurality of identical mounting bands 60 may be provided, each mounting band 60 being secured to a respective clamping region 13, 13' of any respective one of the housings, irrespective of the different first surface level S1 of each clamping region. In particular, the mounting surface 61 and internal surface 62 of each mounting band 60 may be identical in their configuration and dimensions, for example, each defining a cylinder of predefined diameter.

Since each mounting band 60 defines an identical mounting surface 61, a plurality of identical mounting connectors 70, 70' may similarly be provided, whereby the mounting surface 61 is configured to receive any one of the mounting connectors 70, 70' so that any of the plurality of exhaust gas treatment assemblies 1, 1' may be mounted in any one of the mounting connectors 70, 70'.

Together, each mounting band 60 and mounting connector 70, 70' thus form a mounting assembly 80, whereby each of a plurality of identical mounting assemblies 80 is configured to engage the identical, predetermined second surface level S2 and section area A2 of each and any one of the housings 10 of the plurality of exhaust gas treatment assemblies 1, 1'. The assemblies 1, 1' may thus be interchangeably connected with any one of the mounting assemblies 80.

It will be appreciated that since the mounting surface 61 and mounting connector 70, 70' are identical for each mounting assembly, the mounting surface 61 may be shaped and dimensioned to be a perfect fit in the mounting connector 70. This makes it possible if desired to weld the mounting connector 70 which is received on the mounting surface 61 to the mounting band 60, so as to provide a more rigid connection between the exhaust gas treatment assembly 1, 1' and the mounting connector 70.

In alternative embodiments, instead of using a mounting band 60, the mounting surface may be the second surface level S2 defined by the radially outward external surface 14" of the at least one protuberance, so that a mounting assembly or mounting connector 70 may be connected directly (e.g. by clamping or welding) to the mounting surface comprising the radially outward external surface 14" of the protuberance.

Conveniently, in embodiments where a mounting band is provided, either or both of the end caps may be releasably connected to the mounting band, optionally by a releasable clamp extending around the mounting band.

As best seen in FIGS. 1-5, 9 and 11, in the illustrated embodiment each of the first and second end caps 40, 50 has a cylindrical connection portion 42, 52. After the mounting bands 60 are connected to the clamping regions 13, 13' of the housing, each end cap is positioned over the axial end of the respective mounting band 60 so that the connection portion 42, 52 forms a close or interference fit over its raised region 63. A releasable service clamp 90 may then be arranged radially outwardly over the connected parts of the end cap and mounting band and tightened to engage over a raised flange on the connector 42, 52 and the rib 64, so as to retain the end cap in gas tight fitting relation on the housing 10.

Figure 14:
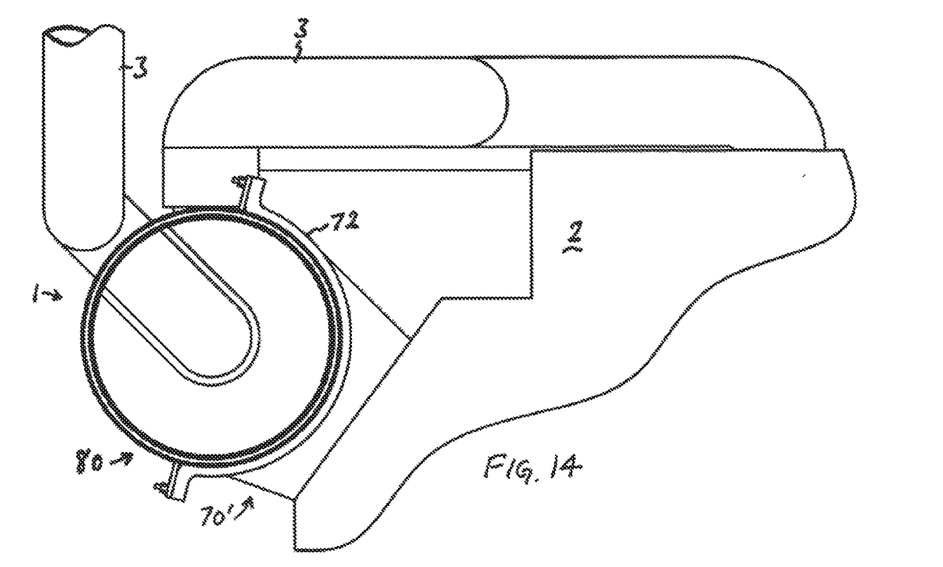
FIG. 14 shows the first assembly mounted in the mounting connector on an engine.

As shown in FIG. 14, the assembly 1 may be mounted on an engine 2 or other support and the inlet and outlet 41, 51 connected respectively to the exhaust gas source, e.g. engine 2 and to the final outlet or further downstream treatment equipment via suitable hose connections 3.

In summary, a first exhaust gas treatment assembly 1 comprises a housing 10 which is radially inwardly deformed in a clamping region 13, 13' to retain a block 30, 31 of ceramic or other material which may be arranged as a filter or catalyst within the housing. The clamping region is deformed to a first surface level S1 and includes local protuberances 16 which extend radially outwardly to a second surface level S2 and support a mounting surface 61 for mounting the assembly in a mounting connector 70, 70'. The first surface level S1 may vary to accommodate the dimensions of each individual block while the second surface level S2 is fixed so that the mounting surface 61 can fit in a mounting assembly 80 with standardised dimensions.

Whereas the first and second surface levels S1, S2 are defined above by reference to a plane containing the axis X which extends vertically in the orientation as shown in FIGS. 9 and 11, it will be understood that where the at least one protuberance extends entirely around the axis X, the surface levels S1, S2 may be defined in any plane containing the axis X.

In alternative embodiments, the at least one protuberance may comprise a single rib or more than two ribs. In yet further alternative embodiments, the at least one protuberance need not extend around the housing, and could be formed for example as a local bump or outward protrusion, optionally a plurality of bumps or protrusions spaced apart along and around the clamping region of the housing. Each exhaust gas treatment assembly may comprise only one mounting surface 61 or more than two mounting surfaces 61 forming part of one or more mounting interfaces comprising one or more mounting assemblies.

Many further possible adaptations within the scope of the claims will be evident to those skilled in the art.

INDUSTRIAL APPLICABILITY

The novel exhaust gas treatment assembly may be used in place of a conventional exhaust gas treatment assembly, for example, where it is desired to minimise the overall axial length of the assembly to fit into a limited space.

As exemplified by the illustrated embodiment, when considered in a plane containing the axis X, the external surface 14 of each clamping region 13, 13' may be arranged at the first surface level S1 for most of the axial length L of the clamping region, which is to say, the at least one protuberance, e.g. ribs 16 extends over a minor proportion of the axial length L of the clamping region. This makes it possible to apply the radially inward clamping pressure over most of the external surface area of the block 30, 31 within the or each respective clamping region.

At the same time, the mounting surface 61 is arranged between the opposite axial extremities of the clamping region 13, 13', so that the mounting assembly 80 comprising the mounting connector 70 and mounting band 60 which together with the mounting surface 61 form the mounting interface may be arranged also in the clamping region 13, 13' of the housing. By spacing apart the first and second surface levels S1 and S2 while providing for the second surface level S2 to define a fixed, predetermined diameter or section area of the housing, it is possible to standardise the mounting interface of each assembly. Thus, the mounting connector 70 and mounting band 60 may have standardised dimensions and (although they may be releasable) may not be adjustable to fit housings of different diameters. The mounting interface may thus provide a firmer connection, optionally a welded connection, compared with the less satisfactory connection that would be obtained by using an adjustable connector to conform to the indeterminate, first surface level S1 of a prior art housing.

The novel assembly may thus provide, ceteris paribus, a firmer connection to the support with reduced overall axial length.

In the claims, reference numerals or letters are provided in parentheses for ease of reference and should not be construed as limiting features.

What is claimed is:

1. A plurality of exhaust gas treatment assemblies, each exhaust gas treatment assembly of the plurality of exhaust gas treatment assemblies including a housing, at least one gas permeable block, and an external mounting surface configured to receive a mounting connector for mounting each exhaust gas treatment assembly on a support;

the housing having an axis and a clamping region, the clamping region having an external surface, an axial length, and opposite axial extremities spaced apart by the axial length;

the housing defining a flowpath extending through the housing along the axis, the at least one gas permeable block being clamped within the clamping region of the housing to extend axially at least to the opposite axial extremities of the clamping region so that exhaust gas may flow along the flowpath through the at least one gas permeable block;

wherein the housing further includes at least one protuberance arranged axially between the opposite axial extremities of the clamping region, wherein, when considered with respect to the axis in a plane containing the axis, the at least one protuberance extends radially outwardly of a first surface level defined by a straight line contacting the external surface of the clamping region at each of its opposite axial extremities, and the external mounting surface is supported by the at least one protuberance and arranged axially between the opposite axial extremities of the clamping region and radially outwardly of the first surface level, wherein, when considered with respect to the axis in said plane containing the axis, the at least one protuberance extends radially outwardly to a second surface level defined by a straight line parallel with the axis and contacting the external surface of the clamping region at the at least one protuberance, but not passing through the at least one protuberance, wherein the first surface level is spaced apart from the axis by a respective, first radial dimension at each respective extremity of the opposite axial extremities of the clamping region, the second surface level being spaced apart from the axis by a second radial dimension, and wherein the second radial dimension is the same for each exhaust gas treatment assembly, but the first radial dimension at each extremity of the opposite axial extremities of the clamping region is different for each exhaust gas treatment assembly.

2. The plurality of exhaust gas treatment assemblies according to claim 1, wherein when considered in said plane containing the axis, the external surface of the clamping region is arranged at the first surface level for most of the axial length of the clamping region.

3. The plurality of exhaust gas treatment assemblies according to claim 2, wherein the first surface level is parallel with the axis, and the external surface of the clamping region extending along said most of the axial length of the clamping region is cylindrical.

4. The plurality of exhaust gas treatment assemblies according to claim 3, wherein the at least one protuberance comprises an annular rib.

5. The plurality of exhaust gas treatment assemblies according to claim 3, wherein the at least one protuberance comprises two annular ribs arranged in axially spaced relation.

6. The plurality of exhaust gas treatment assemblies according to claim 1, wherein the external surface of the clamping region is an external surface of a wall having a substantially constant thickness throughout the axial length of the clamping region in said plane containing the axis, and the at least one protuberance comprises a region of the wall which is deformed radially outwardly with respect to the axis.

7. The plurality of exhaust gas treatment assemblies according to claim 1, wherein the assembly includes a mounting band extending around the housing in contact with the at least one protuberance, and the mounting surface is a radially outward surface of the mounting band.

8. The plurality of exhaust gas treatment assemblies according to claim 7, including a mounting connector for mounting the assembly on a support, the mounting connector being received on the external mounting surface and welded to the mounting band.

9. The plurality of exhaust gas treatment assemblies according to claim 7, wherein the mounting band is fixed to an axial end region of the housing, and when considered with respect to the axis in said plane containing the axis, a radially outward surface of the housing at said axial end region is arranged radially outwardly of the first surface level.

10. The plurality of exhaust gas treatment assemblies according to claim 7, wherein the assembly includes an end cap, the end cap being releasably connected to the mounting band.

11. The plurality of exhaust gas treatment assemblies according to claim 10, wherein the end cap is connected to the mounting band by a releasable clamp extending around the mounting band.

12. The plurality of exhaust gas treatment assemblies according to claim 1, wherein the at least one protuberance comprises at least one rib extending around the axis, and the second surface level extends around the axis to define a predetermined section area in a plane normal to the axis, said predetermined section area being the same for each exhaust gas treatment assembly, the plurality of exhaust gas treatment assemblies further including a plurality of identical mounting assemblies, wherein each mounting assembly is configured to engage the predetermined section area of the housing.

13. The plurality of exhaust gas treatment assemblies according to claim 12, wherein the second surface level defines a cylindrical surface of rotation about the axis.

14. An engine including one exhaust gas treatment assembly of the plurality of exhaust gas treatment assemblies according to claim 1, wherein the one exhaust gas treatment assembly is mounted on the engine by a mounting connector received on the mounting surface.

\* \* \* \* \*